(12) United States Patent
Kakui et al.

(10) Patent No.: US 7,907,341 B2
(45) Date of Patent: Mar. 15, 2011

(54) LASER PROCESSING METHOD AND LASER PROCESSING APPARATUS

(75) Inventors: Motoki Kakui, Yokohama (JP); Keiji Fuse, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 146 days.

(21) Appl. No.: 11/902,966

(22) Filed: Sep. 26, 2007

(65) Prior Publication Data

US 2008/0180788 A1    Jul. 31, 2008

(30) Foreign Application Priority Data

Sep. 28, 2006 (JP) ................ P2006-264936

(51) Int. Cl.
*G02B 27/08* (2006.01)
*G02B 27/10* (2006.01)
*H04B 10/17* (2006.01)

(52) U.S. Cl. ............ 359/618; 359/333; 359/626; 372/6; 372/9

(58) Field of Classification Search .............. 359/333, 359/618, 626; 372/6, 9
See application file for complete search history.

(56) References Cited

U.S. PATENT DOCUMENTS

| 5,453,814 A * | 9/1995 | Aiyer ........................ 355/70 |
| 6,184,490 B1 * | 2/2001 | Schweizer ............ 219/121.77 |
| 6,496,301 B1 * | 12/2002 | Koplow et al. ............. 359/337 |
| 6,720,519 B2 * | 4/2004 | Liu et al. ................ 219/121.61 |
| 6,738,396 B2 * | 5/2004 | Filgas et al. ................. 372/19 |
| 2003/0102291 A1 * | 6/2003 | Liu et al. ................ 219/121.73 |
| 2003/0156605 A1 * | 8/2003 | Richardson et al. ........ 372/25 |
| 2004/0223225 A1 * | 11/2004 | Mikhailov ................. 359/619 |

FOREIGN PATENT DOCUMENTS

JP        2003-114400       4/2003

* cited by examiner

*Primary Examiner* — Eric Bolda
(74) *Attorney, Agent, or Firm* — Venable LLP; Michael A. Sartori; Steven J. Schwarz

(57) ABSTRACT

The present invention relates to a laser processing method and laser processing apparatus for enabling improvement and maintenance of homogenization of a beam intensity distribution in an irradiated region. The laser processing apparatus comprises, at least, an ASE light generation section for emitting ASE light, and a homogenizer for splitting the ASE light into multiple beams. The ASE generation section for emitting the ASE light as processing laser light is provided, and whereby the deterioration of homogenization due to inter-beam interference is suppressed. The homogenization of beam intensity distribution is improved by locating a condenser lens relative to an object such that the object is shifted from a focus position of the condenser lens in the homogenizer, by intentionally deteriorating a beam quality $M^2$ of the ASE light itself emitted from the ASE light generation section to about 2 to 10, or by a combination of these, in laser processing.

11 Claims, 10 Drawing Sheets

LASER PROCESSING METHOD AND LASER PROCESSING APPARATUS

BACKGROUND OF THE INVENTION

1. Field of the Invention

The present invention relates to a laser processing method of splitting laser to be used in processing into multiple beams and irradiating a surface of an object with the beams, and a laser processing apparatus for enabling the laser processing method.

2. Related Background Art

In a technology of irradiating a workpiece with laser light to process the workpiece, the beam quality of the laser light is extremely important. For example, where the laser light is condensed to increase the beam intensity in a light condensing spot, the laser light preferably has the beam quality $M^2$ close to the diffraction limit capable of narrowing the light condensing spot to a high density. Namely, it is desirable that the beam quality $M^2$ be nearly 1. The laser light with the beam quality $M^2$ of nearly 1 in this manner is suitable, particularly, for removal processing such as boring or cutting.

On the other hand, where a joining processing is performed by a laser light irradiation, the laser light must be irradiated simultaneously onto two or more workpieces. For this reason, it is unpreferable that the light condensing spot be limited to a too narrow region. Instead, it is desirable that a beam intensity distribution in an irradiated region be a flat-topped homogeneous distribution. A homogenizer including a diffractive optical element, for example, as disclosed in Japanese Patent Application Laid-Open No. 2003-114400, is proposed as a technology to meet such a demand.

SUMMARY OF THE INVENTION

The present inventors have examined conventional laser processing apparatuses as a result, have discovered the following problems. That is, there were no particular restrictions on requirements for spectrum characteristics of the processing laser light with the homogenizer including the diffractive optical element as disclosed in the above Japanese Patent Application Laid-Open No. 2003-114400. For this reason, when a solid-state laser light source using a conventionally popular YAG crystal or the like is used, interference patterns appear in the intensity distribution of the beam projected through the homogenizer. This is because a gain spectrum of Nd or Yb or the like in the YAG crystal is narrowband, and as a result, there was the problem that homogeneity of the beam intensity distribution in the irradiated region was deteriorated.

The present invention has been developed to eliminate the problems described above. It is an object of the present invention to provide a laser processing method and laser processing apparatus with a structure for enabling improvement and maintenance of homogenization of the beam intensity distribution in the irradiated region.

The laser processing method and laser processing apparatus according to the present invention make use of ASE (Amplified Spontaneous Emission) light with a wide spectral band as the processing laser light, and thereby effectively suppress the inter-beam interference in the irradiated region.

In concrete terms, a laser processing apparatus according to the present invention comprises, at least, an ASE light generation section for outputting ASE light having a spectrum with a predetermined half width as processing laser light, and a homogenizer for enabling a surface irradiation with a plurality of beams generated from the ASE light. The ASE light generation section includes an optical amplification medium doped with a rare earth element, and a pumping light source for outputting pump light to be supplied into the optical amplification medium. The homogenizer includes a diffractive optical element for splitting the ASE light outputted from the ASE light generation section, into a plurality of beams, and a condenser lens for condensing each of the plurality of beams outputted from the diffractive optical element. The laser processing apparatus according to the present invention may further comprise an arrangement adjusting mechanism. The arrangement adjusting mechanism adjusts arrangement of the condenser lens relative to an object such that a beam-irradiated surface of the object is shifted by a predetermined distance along the optical axis of the condenser lens from a focus position of the condenser lens.

In the laser processing apparatus according to the present invention, the optical amplification medium is mainly comprised of glass. In this case, the optical amplification medium preferably includes an amplification optical fiber whose core diameter at a light exit end is 20 μm or more.

The laser processing apparatus according to the present invention may further comprise an optical amplifier arranged on an optical path between the ASE light generation section and the homogenizer. In the configuration that the optical amplifier is provided, an amplification optical fiber in the optical amplifier preferably has a core diameter of about 20 μm and NA of about 0.08. The reason is that by increasing the ratio of the core diameter to the cladding diameter in this manner, it becomes feasible to improve unsaturated absorption per unit length for light of the wavelength of 975 nm and to improve pumping efficiency.

A laser processing method according to the present invention uses the laser processing apparatus with the above-described structure (laser processing apparatus according to the present invention), and enables a laser surface processing on the object by defocusing of the processing laser light (ASE light) irradiated onto the object, intentional deterioration of the beam quality $M^2$ of the processing laser light, or a combination of these.

In concrete terms, a laser processing method according to the present invention splits ASE light generated as processing laser light, once into a plurality of beams, and thereafter irradiates each of the plurality of beams through a condenser lens onto an object.

Particularly, in the case of the laser processing by defocusing, the condenser lens in the homogenizer is located relative to the object such that a beam-irradiated surface of the object is shifted by a predetermined distance along the optical axis of the condenser lens from a focus position of the condenser lens. In this arrangement state, the ASE light having a spectrum with a predetermined half width is generated as the processing laser light, the ASE light thus generated is split into a plurality of beams, and then each of the plurality of split beams is irradiated through the condenser lens onto the object. In the case of the laser processing by such defocusing, the beam quality $M^2$ of the ASE light generated is preferably 1 or more but 2 or less, in order to secure a sufficient aerial propagation distance of the processing laser light.

On the other hand, in the case where the beam quality $M^2$ of the processing laser light is intentionally deteriorated, the processing laser light generated is the ASE light which has a spectrum with a predetermined half width and which has a beam quality $M^2$ of 2 or more but less than 10. The ASE light thus generated is split into a plurality of beams, and each of the plurality of split beams is irradiated through the condenser lens onto the object.

The ASE light to be generated preferably has a spectrum whose full width at half maximum is over 35 nm. In the irradiation of the object with the processing laser light, the spectrum shape of the ASE light may be varied with time with a time constant of 10 ms or less. Each of the plurality of beams may be continuously projected for 10 ms or more onto each of beam-irradiated regions on the object.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will be apparent to those skilled in the art from this detailed description.

DESCRIPTION OF THE PREFERRED EMBODIMENTS

Figure 1:
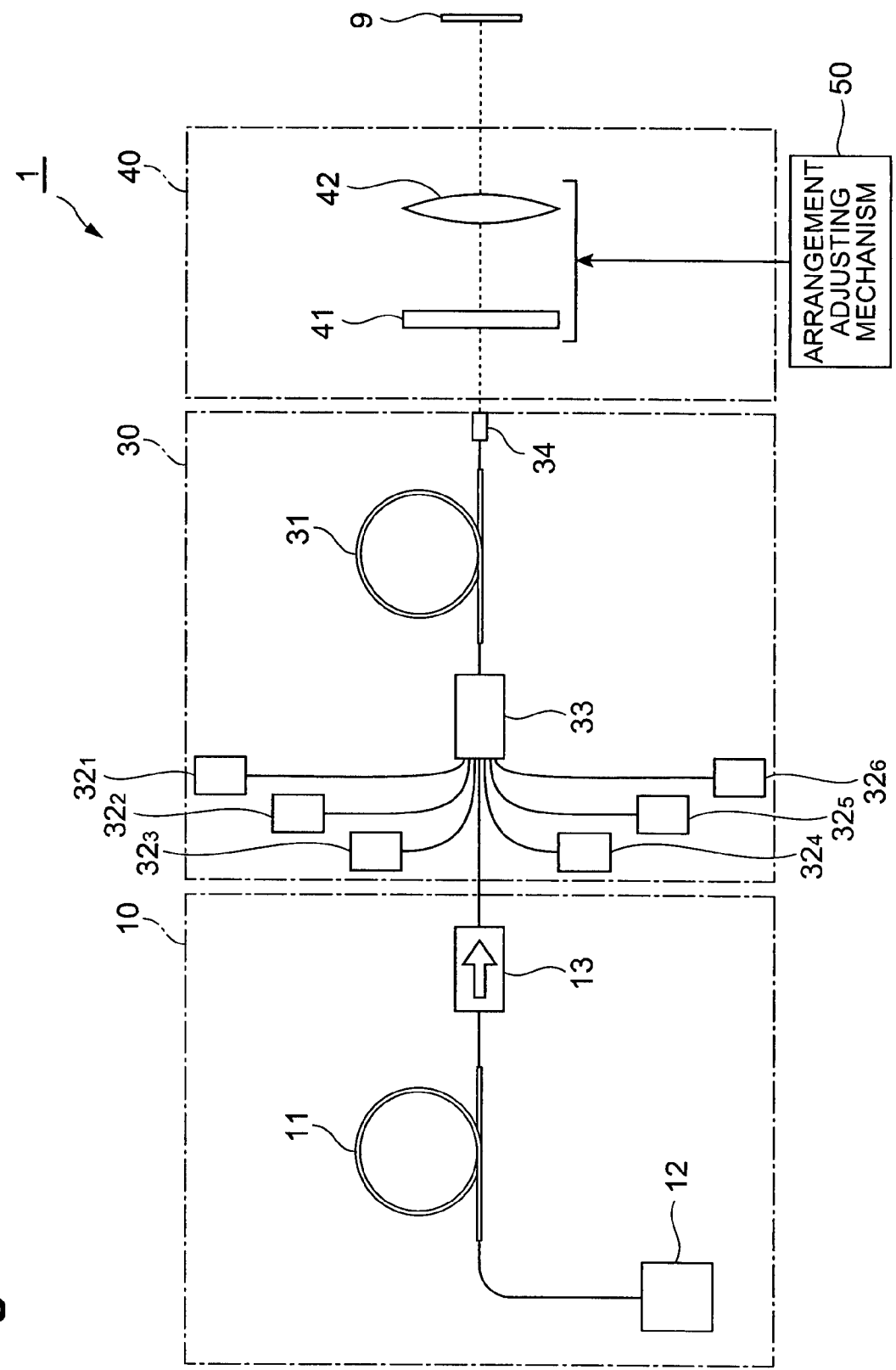
FIG. 1 is a drawing showing a configuration of a first embodiment of the laser processing apparatus according to the present invention.

In the following, embodiments of the laser processing method and laser processing apparatus according to the present invention will be explained below in detail with reference to FIGS. 1-7, 8A, 8B, 9, and 10. In the description of the drawings, identical or corresponding components are designated by the same reference numerals, and overlapping description is omitted.

First Embodiment of Apparatus

First, a first embodiment of the laser processing apparatus for enabling the laser processing method according to the present invention will be described. FIG. 1 is a drawing showing a configuration of a first embodiment of the laser processing apparatus according to the present invention. The processing apparatus 1 shown in FIG. 1 comprises an ASE light generation section 10, an optical amplification section 30, a homogenizer 40, and an arrangement adjusting mechanism 50. ASE light outputted from the ASE light generation section 10 is amplified by the optical amplification section 30, the amplified light travels through the homogenizer 40, and then the ASE light (multiple beams) outputted from the homogenizer 40 is irradiated onto a workpiece 9 (a laser surface processing to the workpiece 9).

The ASE light generation section 10 includes an Yb-doped optical fiber 11, a pumping light source 12, and an optical isolator 13. The Yb-doped optical fiber 11 is an optical amplification medium which is mainly comprised of silica glass and which has an optical waveguide region doped with the Yb element as a rare earth element. The pumping light source 12 outputs pump light to be supplied to the Yb-doped optical fiber 11. The optical isolator 13 allows the ASE light having been outputted from the Yb-doped optical fiber 11 and having arrived, to pass to the optical amplification section 30, but does not allow light to pass in the opposite direction.

Preferably, the Yb-doped optical fiber 11 is an optical fiber for amplification having a single cladding structure. The pumping light source 12 is a laser diode that outputs 0.98 μm single-mode pump light of 500 mW class. The Yb-doped optical fiber 11 has the core with a diameter of 5 μm, unsaturated absorption peak of 240 dB/m, and total length of 20 m.

The optical amplification section 30 includes an Yb-doped optical fiber 31, pumping light sources $32_1$ to $32_6$, a combiner 33, and a collimator 34. The Yb-doped optical fiber 31 is an optical amplification medium which is mainly comprised of silica glass and which has an optical waveguide region doped with the Yb element as a rare earth element. Each of the pumping light sources $32_1$ to $32_6$ outputs a pump light beam to be supplied to the Yb-doped optical fiber 31. The combiner 33 receives input of the pump light beams outputted from the pumping light sources $32_1$ to $32_6$, together with the ASE light outputted from the ASE light generation section 10, and outputs combined light of these ASE light and pump light beams to the Yb-doped optical fiber 31. The collimator 34 collimates the ASE light amplified in the Yb-doped optical fiber 31 and the collimated ASE light is guided to the homogenizer 40. In the configuration wherein the amplification optical fiber is installed immediately before the homogenizer 40, the Yb-doped optical fiber 31 being the amplification optical fiber preferably has the core with a diameter of about 20 μm and NA of about 0.08. The reason is that such an increase in the ratio of the core diameter to the cladding diameter can lead to an improvement in unsaturated absorption per unit length for light of the wavelength 975 nm and an improvement in pumping efficiency. In a configuration without the light amplifier 30, however, the core diameter of the Yb-doped optical fiber 11 (the amplification optical fiber closest to the homogenizer 40) is more preferably 20 μm or more. In this case, it is also feasible to achieve an improvement in pumping efficiency and to further promote homogenization of intensity distribution of the processing laser light outputted from the homogenizer 40.

Preferably, the Yb-doped optical fiber 31 is an optical fiber for amplification having a double cladding structure. The pumping light sources $32_1$ to $32_6$ are laser diodes that output 0.98 μm multi-mode pump light. The Yb-doped optical fiber 31 has a core with the outer diameter of 6 μm, an inner cladding with the outer diameter of 125 μm, and an outer cladding, and a cross section of the inner cladding is not a perfect circle. The unsaturated absorption per unit length for light of the wavelength 975 nm propagating in the inner cladding of the Yb-doped optical fiber 31 is 2 dB/m. The power of the pump light of the 0.98 μm wavelength band injected into the Yb-doped optical fiber 31 is 10 W, and the power of the output ASE light 7 W.

The homogenizer 40 includes a diffractive optical element 41 and a condenser lens 42. The diffractive optical element 41 receives input of the ASE light having been outputted from the ASE light generation section 10 and having been amplified and collimated in the optical amplification section 30. The input ASE light is split into multiple beams by the diffractive optical element 41. The diffractive optical element 41 has a shape of a transparent and approximately flat plate and two-dimensional uneven patterns are formed in a principal surface thereof. The diffractive optical element 41 splits the inputted ASE light into multiple beams by making use of the diffraction phenomenon such that phase change amounts of incident light are dependent on positions of incidence. The condenser lens 42 condenses each of the multiple beams outputted from the diffractive optical element 41, toward the workpiece 9 (to effect laser irradiation). For example, the focal length of the condenser lens 42 is 100 mm.

The laser processing method according to the present invention is to implement a laser processing by using the laser processing apparatus 1 having the structure as described above, and on that occasion, beam homogeneity in an irradiated region is improved by defocusing, intentional degradation of beam quality, or a combination of these.

For effecting defocusing, the workpiece 9 may be located on the rear focal plane of the condenser lens 42, but is preferably located at a position different from the rear focal plane of the condenser lens 42. The latter arrangement can further homogenize the irradiation intensity distribution on the workpiece 9. However, when the workpiece 9 largely deviates from the rear focal plane of the condenser lens 42, the peak intensity of the irradiation beams will be deteriorated; therefore, permissible deviation is approximately ±10% of the focal length. Therefore, the distance between the condenser lens 42 and the workpiece 9 is preferably within the range of 90 mm to 110 mm.

The below will describe the operation of the laser processing apparatus 1 in the case where the defocusing of the ASE light effected. In the ASE light generation section 10, the pump light outputted from the pumping light source 12 is supplied into the Yb-doped optical fiber 11 and the ASE light is generated in the Yb-doped optical fiber 11. The generated ASE light travels through the optical isolator 13 to be outputted to the optical amplification section 30.

In the optical amplification section 30, the pump light outputted from the pumping light sources $32_1$ to $32_6$ is supplied through the combiner 33 into the Yb-doped optical fiber 31. The ASE light outputted from the ASE light generation section 10 is also fed through the combiner 33 into the Yb-doped optical fiber 31, whereby the ASE light fed into the Yb-doped optical fiber 31 is amplified in the Yb-doped optical fiber 31. The amplified ASE light is collimated by the collimator 34 and thereafter the collimated ASE light is outputted to the homogenizer 40.

In the homogenizer 40, the ASE light (collimated light) outputted from the optical amplification section 30 is split into multiple beams by the diffractive optical element 41. Each of the multiple beams outputted from the diffractive optical element 41 is condensed by the condenser lens 42 to be projected onto the workpiece 9. The arrangement of the condenser lens 42 relative to the workpiece 9 is adjusted by the arrangement adjusting mechanism 50. Namely, the arrangement adjusting mechanism 50 adjusts the arrangement of the condenser lens 42 relative to the workpiece 9 such that the beam-irradiated surface of the workpiece 9 is shifted by a predetermined distance along the optical axis AX of the condenser lens 42 from the focal position of the condenser lens 42. In a case where the homogenizer 40 is integrally composed of the diffractive optical element 41 and the condenser lens 42, the arrangement adjusting mechanism 50 adjusts the arrangement of the entire homogenizer 40 including the condenser lens 42.

Figure 2:
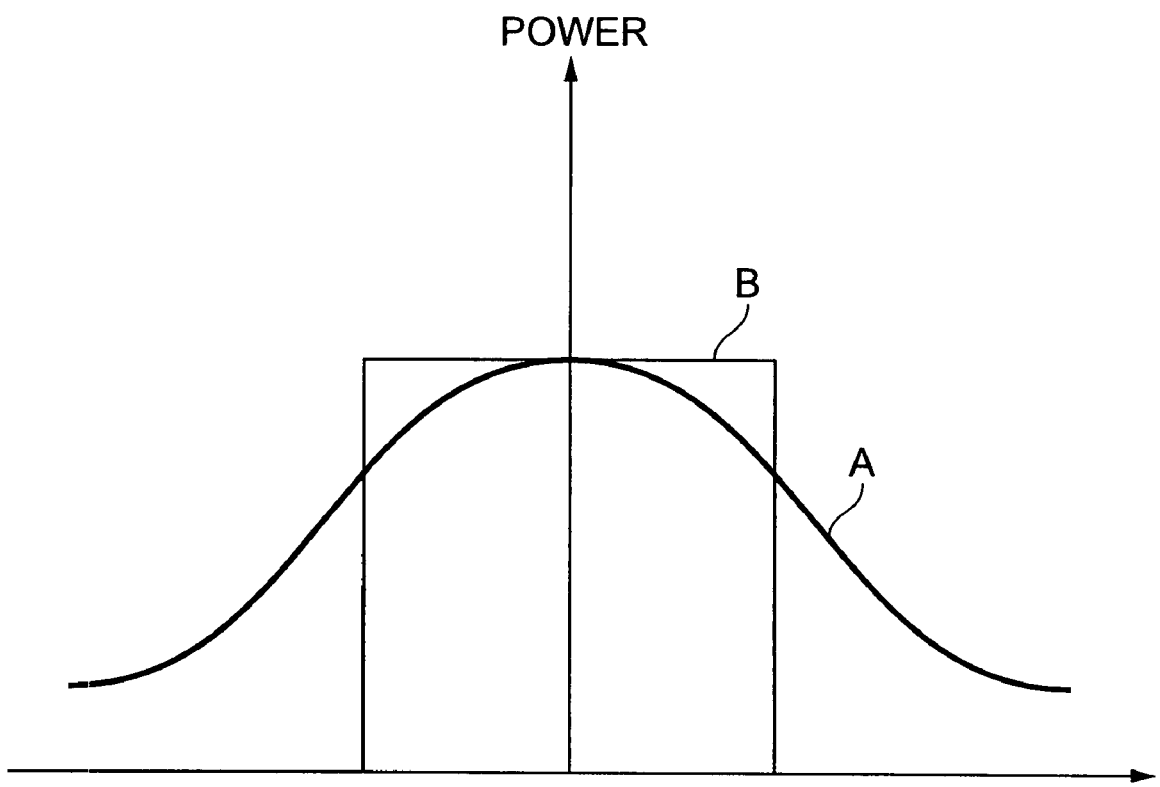
FIG. 2 is a drawing showing power distributions of light beam cross sections in the laser processing apparatus according to the first embodiment.

FIG. 2 is a drawing showing power distributions of light beam cross sections in the laser processing apparatus 1 according to the first embodiment. The ASE light traveling from the optical amplification section 30 to the homogenizer 40 has the power distribution indicated by A in the drawing (or has a shape of a Gaussian distribution). In contrast to it, the ASE light outputted from the homogenizer 40, ideally, has the power distribution indicated by B in the drawing (or has a homogeneous distribution in a certain range).

Figure 3:
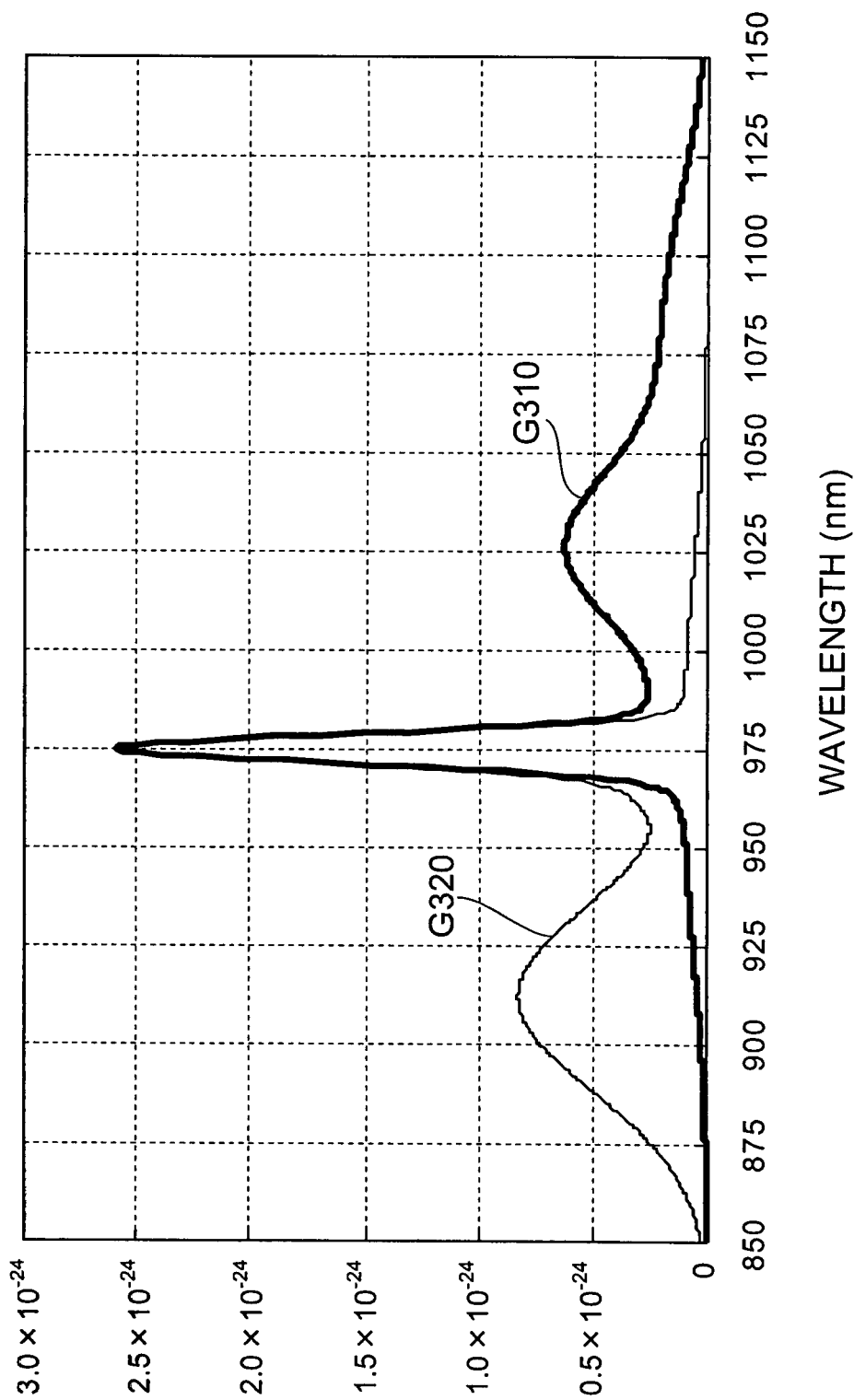
FIG. 3 shows spectra of respective induced emission cross section and absorption cross section of an Yb-doped optical fiber.

FIG. 3 shows spectra of respective induced emission cross section (G310) and absorption cross section (G320) of an Yb-doped optical fiber. When a crystal is doped with the Yb element, a gain spectrum of the Yb-doped crystal is a narrow-band spectrum; whereas, when a glass such as optical fiber is doped with the Yb element, a gain spectrum is a continuous spectrum, as seen from this figure. Therefore, the spectrum bandwidth of the ASE light outputted from the ASE light generation section 10 can be widened. This is also the case with the other rare earth elements (e.g., Nd, Er, etc.), in addition to the Yb element, and with glass rods as well as the optical fiber. Among others, the Yb-doped optical fiber is the optical amplification medium optimal for high-power output because the wavelength of pump light is close to the wavelength of amplified light so as to achieve high quantum conversion efficiency.

Figure 4:
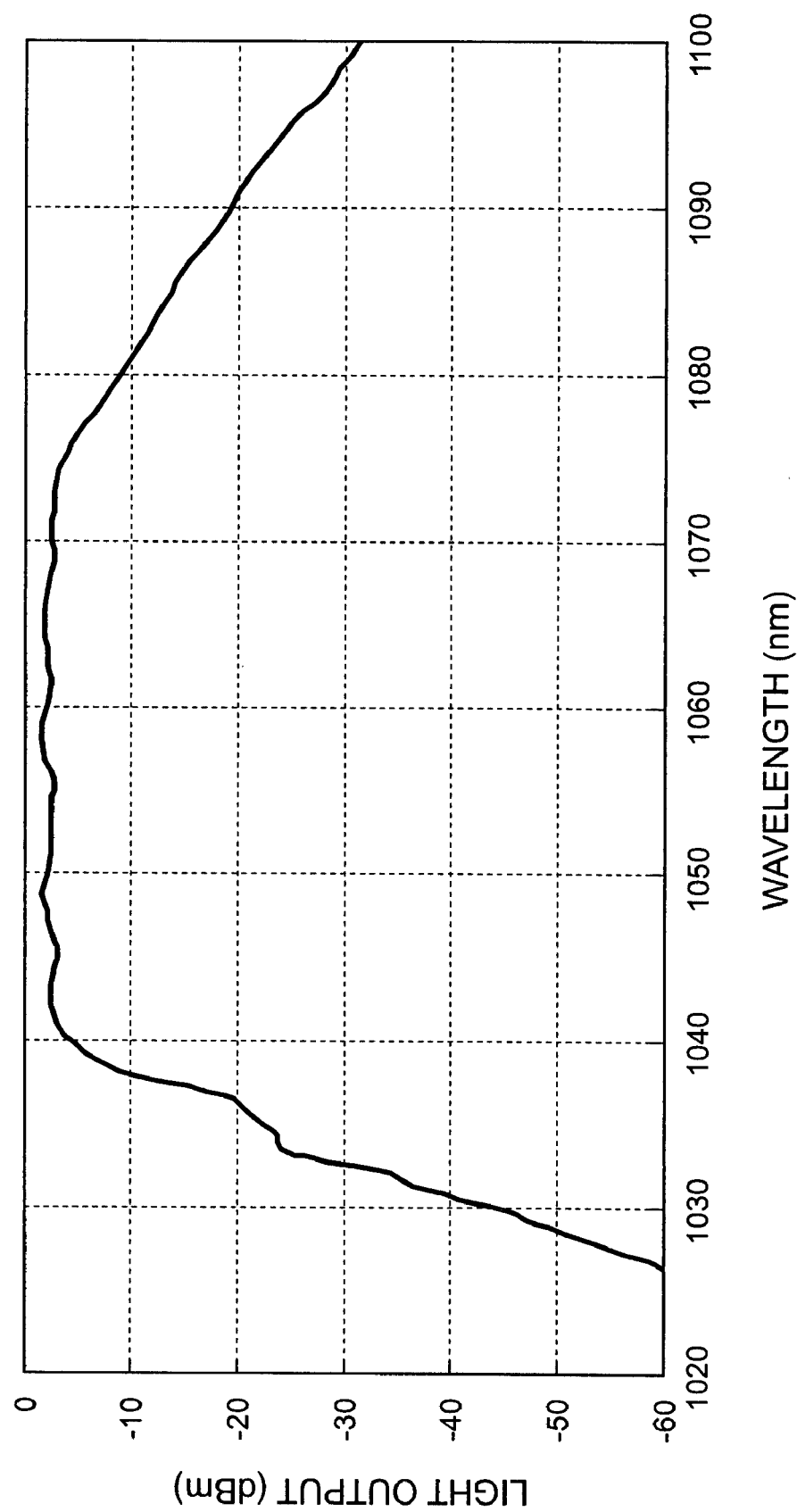
FIG. 4 shows a spectrum of ASE light outputted from the laser processing apparatus according to the first embodiment.

FIG. 4 shows a spectrum of the ASE light outputted from the laser processing apparatus 1 according to the first embodiment. As shown in this figure, the laser processing apparatus 1 obtains the light output spectrum that is nearly flat over the wavelength range of 1040 nm to 1075 nm and that has the full width at half maximum of 35 nm or more, without use of an optical component having a wavelength-dependent loss spectrum, such as a gain equalizing filter.

Figure 5:
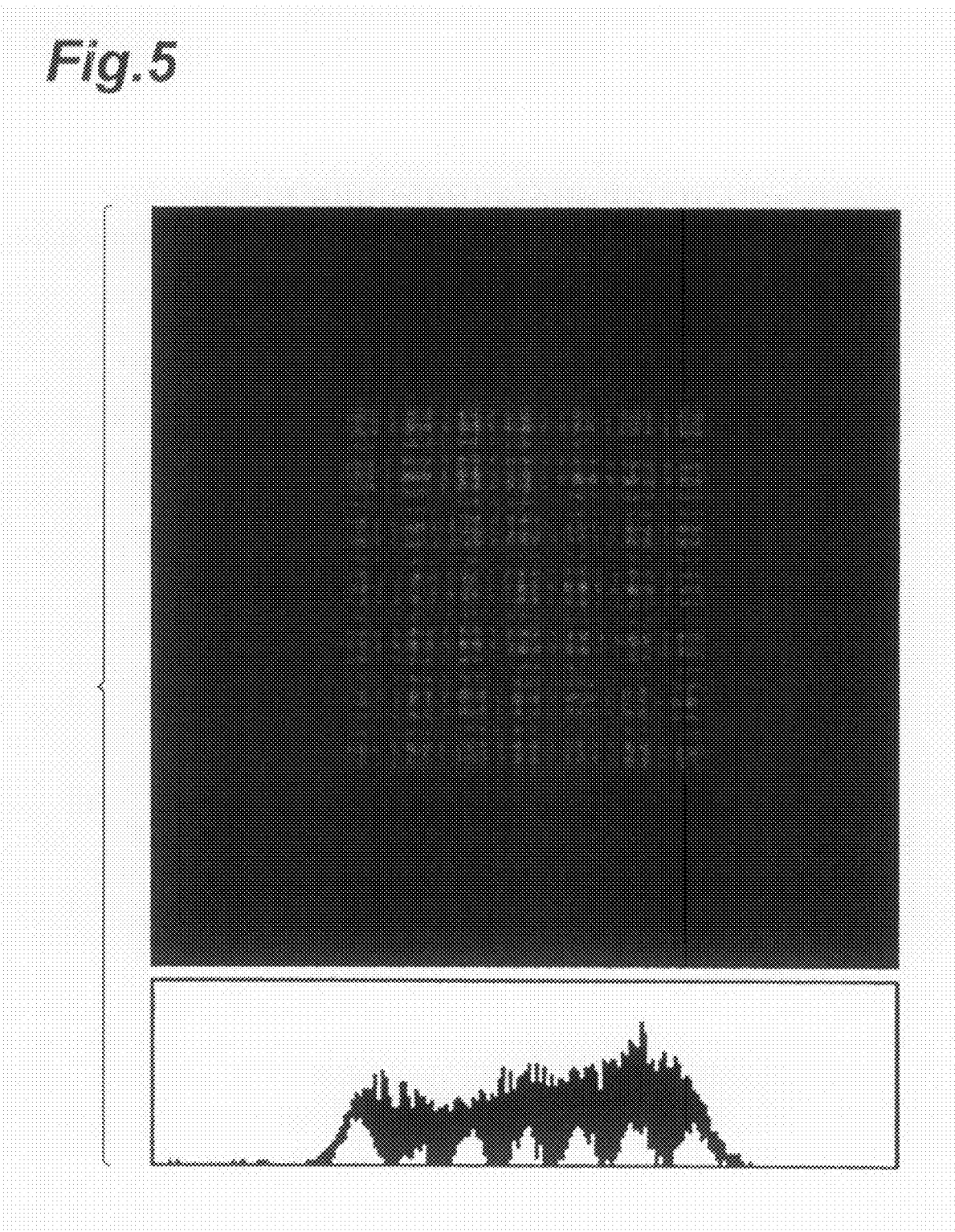
FIG. 5 is a drawing showing an intensity distribution of light outputted from a homogenizer when light with a single wavelength of 1065 nm is fed.
Figure 6:
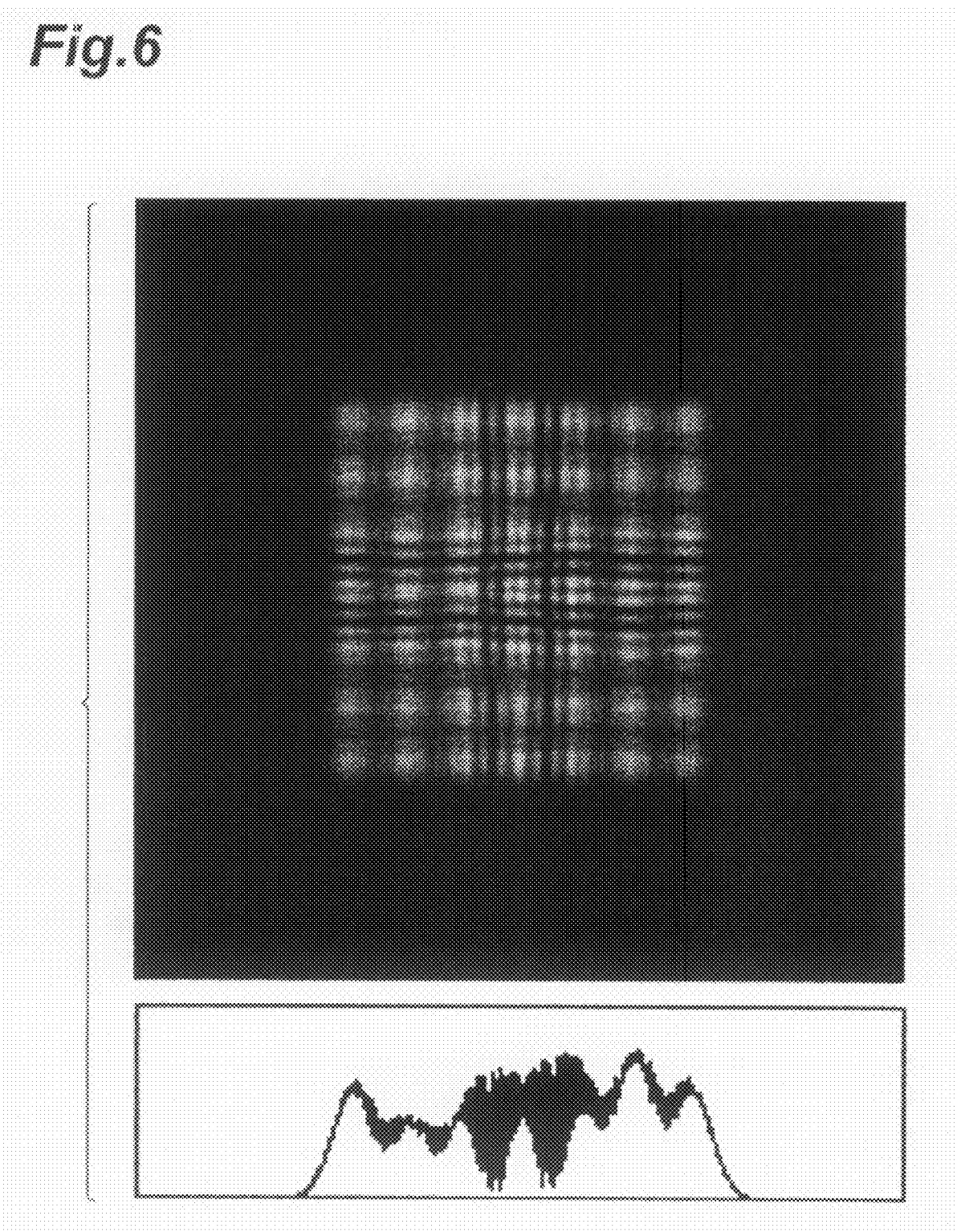
FIG. 6 is a drawing showing an intensity distribution of light outputted from a homogenizer when light with multiple wavelengths at wavelength intervals of 1 nm in a wavelength band of 50 nm centered on the wavelength of 1065 nm is fed.

FIG. 5 is a drawing showing an intensity distribution of light outputted from the homogenizer 40 when light with a single wavelength of 1065 nm is fed into the homogenizer 40. FIG. 6 is a drawing showing an intensity distribution of light outputted from the homogenizer 40 when light of multiple wavelengths at wavelength intervals of 1 nm in the bandwidth of 50 nm centered on the wavelength of 1065 nm is fed into the homogenizer 40. The latter (FIG. 6) is the result of simulation based on approximation of a continuous spectrum light source over the bandwidth of 50 nm. In FIG. 6 interference fringes are observed near the center and this is considered to be due to the limit of simulation based on the approximation model. Namely, analysis of a continuous spectrum by software is difficult and the actual simulation is carried out for discrete spectrum light sources of 50 channels at channel intervals of 1 nm, as an approximation model of the continuous spectrum light source over the bandwidth of 50 nm.

As scan be een from these FIGS. 5 and 6, the interference fringes are reduced and the beam intensity distribution is more homogenized in the case of the bandwidth of 50 nm (FIG. 6), when compared with the case of the single wavelength of 1065 nm (FIG. 5). Namely, in the case of the single wavelength of 1065 nm (FIG. 5), the region where the beam intensity is not more than half of the peak value reaches not less than half of the whole, whereas in the case of the bandwidth of 50 nm (FIG. 6), the region where the beam intensity is not more than half of the peak value is kept 10% or less of the whole; it is, therefore, understood that almost the entire irradiated region is uniformly processed.

Let us define rms represented by the following formula (I) below, as an index of homogeneity. When an rms value is divided by an average power $P_0$ in the entire area to obtain a ratio, the ratio is 99% in the case of the single wavelength of 1065 nm (FIG. 5), whereas the ratio is found to be improved to 37% in the case of the bandwidth of 50 nm (FIG. 6). P(x,y) is a power at each point, and S is an area. Since this calculation is based on the assumption of the discrete spectra of 50 wavelengths instead of the continuous spectrum, an actual improvement is presumed to be better.

$$rms = \{(\iint(P(x,y) - P_0)^2 dxdy)/S\}^{1/2} \quad (1)$$

Figure 7:
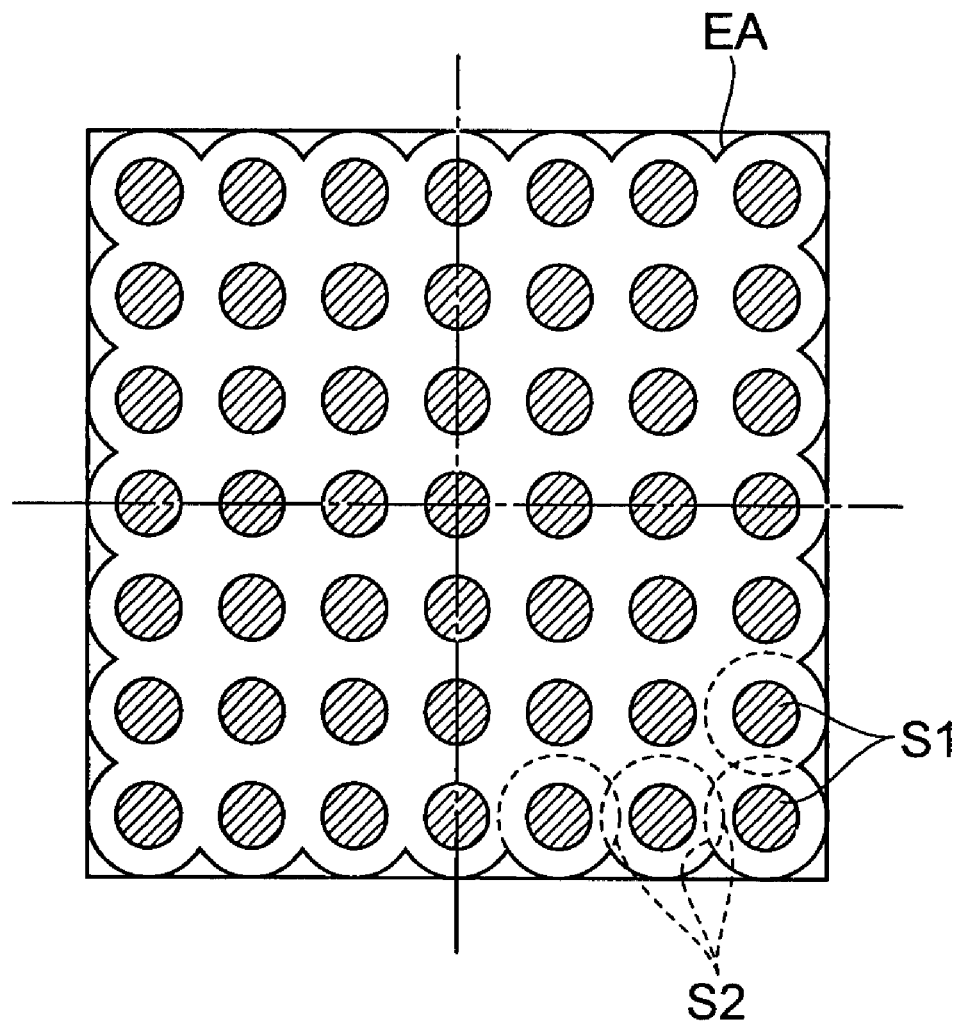
FIG. 7 is a drawing showing emission patterns of multiple beams outputted from a homogenizer.

Even in the case where the beam intensity distribution in the irradiated region is finally widened to a flat-topped distribution, the beam quality $M^2$ of the ASE light outputted from the ASE light generation section 10 is preferably nearly 1 (diffraction limit). The diffraction-limited beam can be regarded as substantial parallel light which can ensure the aerial propagation distance of several ten cm to drastically improve freedom of design for processing facilities. FIG. 7 is a drawing showing emission patterns of multiple beams outputted from the homogenizer 40. As shown in this figure, each of the multiple beams outputted from the homogenizer 40 reaches the interior of the irradiated region EA. S1 in the irradiated region EA indicates beam irradiation patterns in the case where the beam quality $M^2$ is 1, and S2 indicates beam irradiation patterns in the case where the beam quality $M^2$ is 2. In the case where the beam quality $M^2$ is 2, each beam spot diameter is enlarged about two times, and adjacent spots overlap in part. However, since the laser processing apparatus 1 uses the ASE light with the wide bandwidth as the processing laser light, there is little influence of inter-beam interference recognized. Therefore, where the laser processing by defocusing is carried out (the first embodiment of the laser processing method according to the present invention) as described above, the beam quality $M^2$ of the ASE light outputted from the ASE light generation section 10 is preferably approximately 1 to 2.

On the other hand, in the case of the laser processing using the homogenizer 40, when the beam quality $M^2$ is deteriorated to some extent, each of the beam spots is blurred, such that we can also expect an effect of promoting homogenization of the beam intensity distribution in the irradiated region. However, when the beam quality $M^2$ is deteriorated too much (for example, when the beam quality $M^2$ exceeds 100 like direct output from an LD), conversely, it becomes infeasible to secure a sufficient aerial propagation distance of the processing laser light outputted from the homogenizer 40. In this case, the workpiece 9 must be always kept close to the condenser lens 42, which deteriorates the advantage of use of the amplification optical fiber.

Therefore, a second embodiment of the laser processing method according to the present invention is characterized by making use of the laser processing apparatus 1 having the structure as described above and letting the ASE light generation section 10 output the ASE light with the beam quality $M^2$ of not less than 2, and less than 10 as the processing laser light.

Figure 8A:
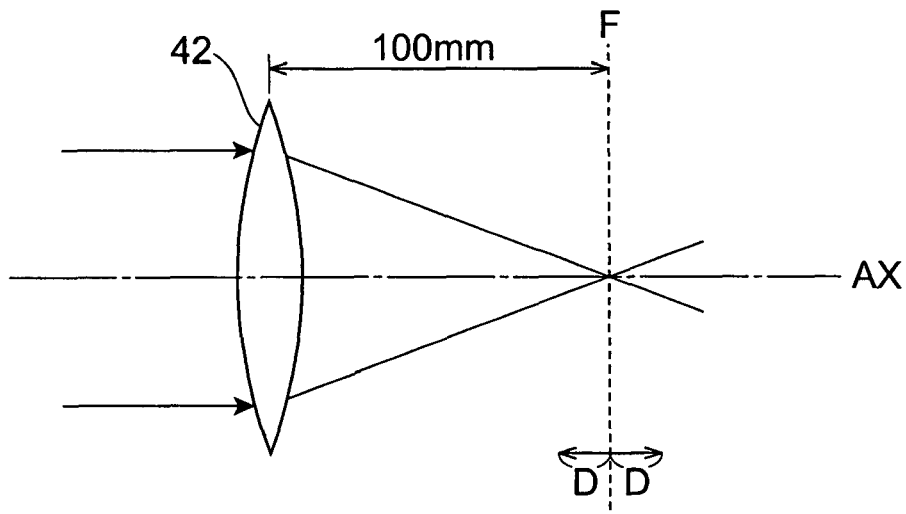
FIGS. 8A and 8B are graphs showing the relationship between spot diameter and defocus distance D for light with different beam qualities $M^2$.
Figure 8B:
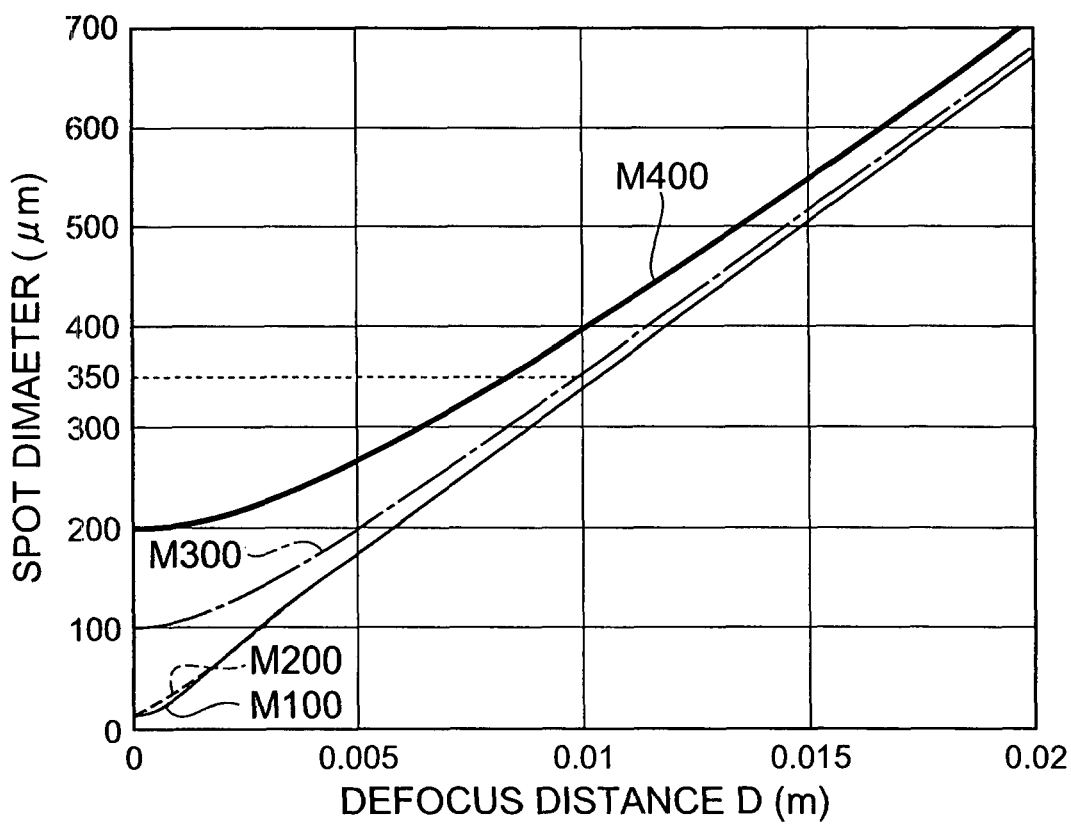

In the case that each of the multiple beams outputted from the homogenizer 40 is blurred too much in the laser processing, the peak intensity of each beam will become lowered (to cause a considerable decrease in processing efficiency). There is another risk that a region to be kept off the processed region (i.e., a region not to be laser-processed, at the position around the processed region) might also be processed by each beam expanded too much. FIGS. 8A and 8B are graphs showing the relationship between spot diameter and defocus distance D for light with different beam qualities $M^2$. The defocus distance D, as shown in FIG. 8A, is given by a deviation amount along the optical axis AX of the condenser lens 42 from the focus position (focal plane F) of the condenser lens 42. In FIG. 8B, graph M100 shows the relationship between spot diameter and defocus distance D for light with the beam quality $M^2$ of 1, graph M200 that for light with the beam quality $M^2$ of 2, graph M300 that for light with the beam quality $M^2$ of 10, and graph M400 that for light with the beam quality $M^2$ of 20.

In the range of ±10% of the focal length 100 mm of the condenser lens 42, i.e., in the range where the defocus distance D is 0 to 0.01 m, the light with the beam quality $M^2$ of 10 has the maximum spot diameter of about 350 μm. Therefore, in the range of the defocus distance D of 0 to 0.01 m, degradation of the beam quality $M^2$ up to the maximum spot diameter of about 350 μm is permissible. For example, where the beam quality $M^2$ is 2 (M200), the tolerance of depth of focus has no significant difference from that of the light with the beam quality $M^2$ of 1. On the other hand, where the beam quality $M^2$ is 20 (M400), the defocus distance D permitted to keep the maximum spot diameter not more than 350 μm is ±8% of the focal length of the condenser lens 42, so as to degrade the tolerance of depth of focus. The permissible beam quality $M^2$ is at most 10 or less. Therefore, the beam quality $M^2$ of the ASE light outputted from the ASE light generation section 10 is preferably set in the range of not less than 2, and less than 10.

Second Embodiment of Apparatus

Next, a second embodiment of the laser processing apparatus according to the present invention will be described. The laser processing method according to the present invention, which enables a laser surface processing on an object by defocusing of the processing laser light (ASE light) projected onto the object, intentional deterioration of the beam quality $M^2$ of the processing laser light, or a combination of these, can also be realized by the laser processing apparatus according to the second embodiment.

Figure 9:
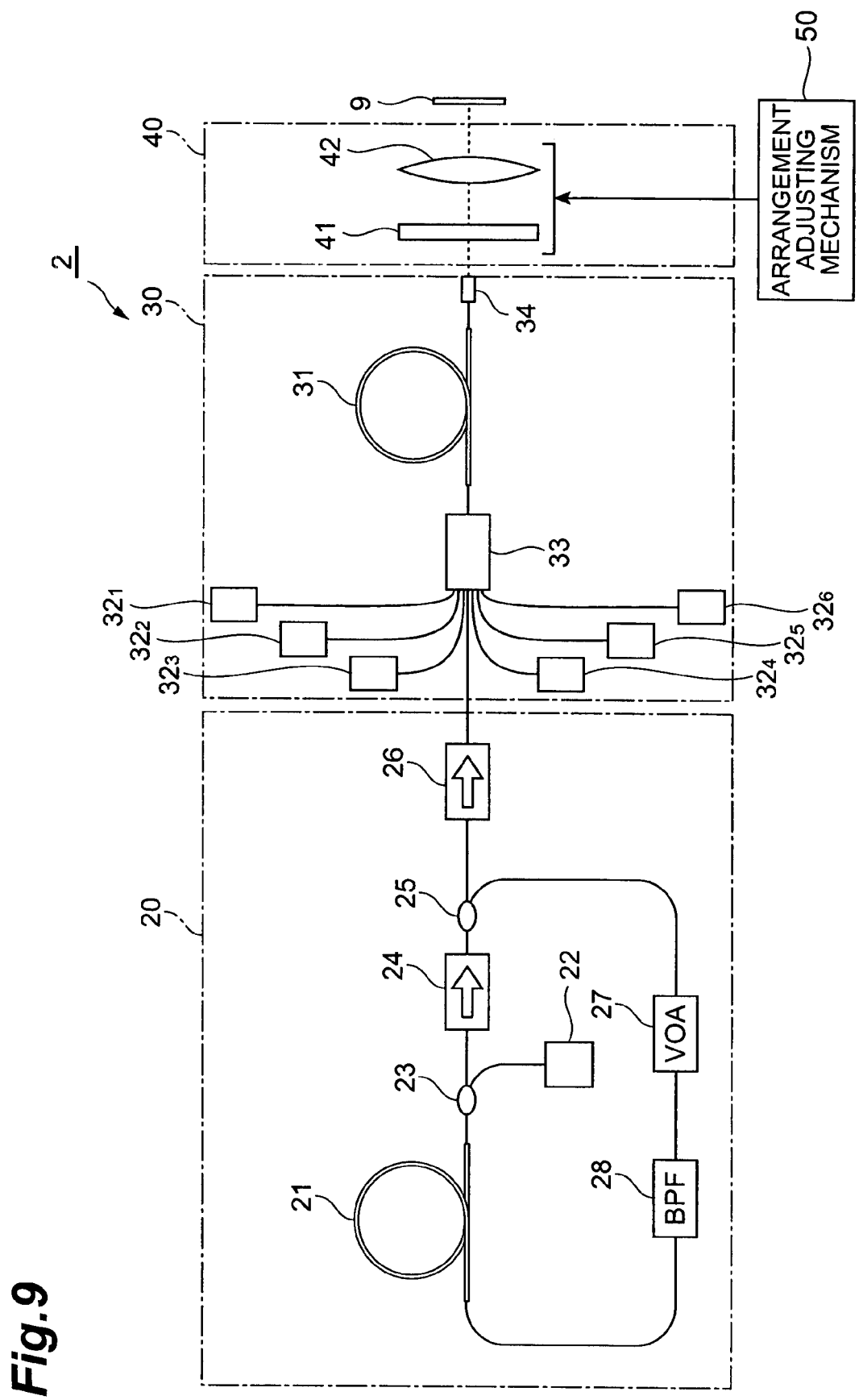
FIG. 9 is a drawing showing a configuration of a second embodiment of the laser processing apparatus according to the present invention.

FIG. 9 is a drawing showing a configuration of a second embodiment of the laser processing apparatus according to the present invention. The laser processing apparatus 2 shown in FIG. 9 comprises an ASE light generation section 20, an optical amplification section 30, a homogenizer 40, and an arrangement adjusting mechanism 50. The ASE light outputted from the ASE light generation section 20 is amplified by the optical amplification section 30 and thereafter the ASE light is guided via the homogenizer 40 to be irradiated onto a workpiece 9 (a laser surface processing to the workpiece 9).

As compared with the configuration of the laser processing apparatus 1 according to the first embodiment shown in FIG. 1, the laser processing apparatus 2 (FIG. 9) according to the second embodiment is different in that it has the ASE light generation section 20 instead of the ASE light generation section 10. The ASE light generation section 20 includes an Yb-doped optical fiber 21, a pumping light source 22, an optical coupler 23, an optical isolator 24, an optical coupler 25, an optical isolator 26, a variable optical attenuator 27, and a band-pass filter 28. Since the other configuration in this second embodiment is substantially identical with that in the first embodiment, the following description will be focused mainly on the difference.

The Yb-doped optical fiber 21 is an optical amplification medium which is mainly comprised of silica glass and which has an optical waveguide region doped with the Yb element as a rare earth element. The pumping light source 22 outputs pump light to be supplied to the Yb-doped optical fiber 21. The optical coupler 23 outputs the pump light coming from the pumping light source 22, to the Yb-doped optical fiber 21 and outputs the ASE light coming from the Yb-doped optical fiber 21, to the optical isolator 24.

The optical isolator 24 allows the ASE light outputted from the optical coupler 23 to pass to the optical coupler 25, but does not allow light to pass in the opposite direction. The optical coupler 25 outputs part of the ASE light coming from the optical isolator 24, to the optical isolator 26 and outputs the rest of the ASE light to the variable optical attenuator 27. The optical isolator 26 allows the ASE light coming from the optical coupler 25 to pass to the optical amplification section 30, but does not allow light to pass in the opposite direction.

The variable optical attenuator 27 attenuates the part of the ASE light separated by the optical coupler 25 and thereafter outputs the attenuated light to the band-pass filter 28. The band-pass filter 28 selectively outputs to the Yb-doped optical fiber 21 the ASE light in the 1090 nm wavelength band (with the full width at half maximum of 5 nm or more) from the ASE light outputted from the variable optical attenuator 27. Since the function of the band-pass filter selectively enhances the ASE light essentially in a wavelength region where the level of ASE light is low, it may be a fused type fiber coupler with wavelength dependence or the like. This ASE light generation section 20 has a feedback loop configuration and the amount of attenuation in the variable optical attenuator 27 is tuned not to oscillate.

The laser processing apparatus 2 operates as described below. The laser processing method to be applied may be any one based on the defocusing of the processing laser light (ASE light) projected onto the object, intentional deterioration of the beam quality $M^2$ of the processing laser light, or a combination of these.

In the ASE light generation section 20, the pump light outputted from the pumping light source 22 travels through the optical coupler 23 to be supplied to the Yb-doped optical fiber 21, and ASE light is generated in the Yb-doped optical fiber 21. The ASE light traveling toward the optical coupler 23 among the ASE light generated in the Yb-doped optical fiber 21 travels through the optical coupler 23 and optical isolator 24 to be fed into the optical coupler 25. Among the ASE light fed from the optical isolator 24 to the optical coupler 25, part thereof travels through the optical isolator 26 to be outputted to the optical amplification section 30, and the rest is outputted to the variable optical attenuator 27.

The ASE light fed from the optical coupler 25 into the variable optical attenuator 27 is subjected to predetermined attenuation in the variable optical attenuator 27, and then the attenuated light is fed into the band-pass filter 28. The ASE light in the 1090 nm wavelength band among the ASE light fed into the band-pass filter 28 is selectively outputted from the band-pass filter 28. The ASE light outputted from the band-pass filter 28 is fed into the Yb-doped optical fiber 21 and amplified in the Yb-doped optical fiber 21.

Figure 10:
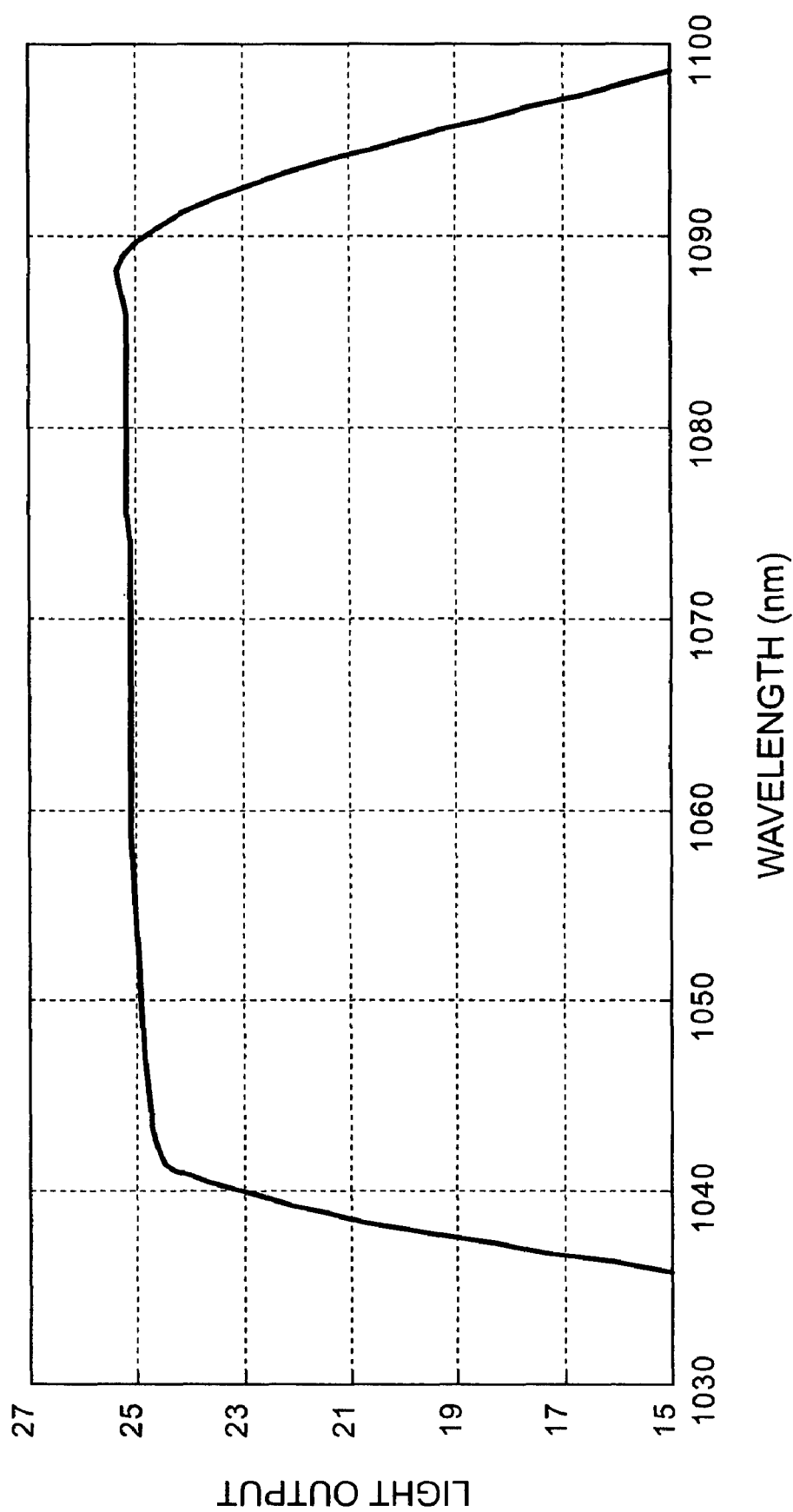
FIG. 10 shows a spectrum of ASE light outputted from the laser processing apparatus according to the second embodiment.

FIG. 10 is a spectrum of the ASE light outputted from the laser processing apparatus 2 of this second embodiment. As shown in this figure, the laser processing apparatus 2 provides a light output spectrum with the bandwidth of 50 nm in the wavelength range of 1040 nm to 1090 nm.

It is often the case that the interference fringes as seen in FIG. 6 inevitably appear to some extent in a specific light output spectrum from the ASE light generation section 20. In order to reduce influence thereof, it can be contemplated that the light output spectrum is made variable by using a device with use of the magnetooptical effect where the time constant is several ten μs and where the insertion loss is tunable, as the variable optical attenuator 27. Since the ASE spectrum depends upon an inverted distribution of Yb ions, a change thereof is dominated by the excitation lifetime (about 1 ms) of Yb ions. Therefore, for the interference fringes as seen in FIG. 6, the varying time constant also becomes of 1 ms order. For this reason, it is desirable to adopt a processing method of irradiating one location on the workpiece 9 continuously for the time of not less than about 10 ms.

As described above, in accordance with the laser processing method and laser processing apparatus according to the present invention, it becomes feasible to realize improvement and maintenance of homogenization of the beam intensity distribution in the irradiated region.

From the invention thus described, it will be obvious that the embodiments of the invention may be varied in many ways. Such variations are not to be regarded as a departure from the scope of the invention, and all such modifications as would be obvious to one skilled in the art are intended for inclusion within the scope of the following claims.

What is claimed is:

1. A laser processing method of splitting processing laser light into a plurality of beams and thereafter projecting each of the plurality of beams through a condenser lens onto an object, said laser processing method comprising the steps of:
   locating said condenser lens relative to the object such that a beam-irradiated surface of the object is shifted by a predetermined distance along the optical axis of said condenser lens from a focus position of said condenser lens;
   generating ASE (Amplified Spontaneous Emission) light having a spectrum with a predetermined full width at half maximum, as the processing laser light;
   splitting the ASE light thus generated, into a plurality of beams, by using a DOE (Diffractive Optical Element); and
   projecting each of the plurality of split beams through said condenser lens onto the object, the plurality of beams thus split being homogenized as a whole and inputted into said condenser lens while being in parallel to each other.

2. A laser processing method according to claim 1, wherein before splitting the ASE light thus generated, a beam quality $M^2$ of the ASE light is 1 or more but 2 or less.

3. A laser processing method according to claim 1, wherein the ASE light has a spectrum whose full width at half maximum is over 35 nm.

4. A laser processing method of splitting processing laser light into a plurality of beams and thereafter projecting each of the plurality of beams through a condenser lens onto an object, said laser processing method comprising the steps of:
   locating said condenser lens relative to the object such that a beam-irradiated surface of the object is shifted by a predetermined distance along the optical axis of said condenser lens from a focus position of said condenser lens;
   generating ASE (Amplified Spontaneous Emission) light having a spectrum with a predetermined full width at half maximum, as the processing laser light,
   splitting the ASE light thus generated, into a plurality of beams; and projecting each of the plurality of split beams thru said condenser lens onto the object, the plurality of beams thus split being homogenized as a whole and inputted into said condenser lens while being in parallel to each other, wherein a spectrum shape of the ASE light is varied with time with a time constant of 10 ms or less.

5. A laser processing method according to claim 3, wherein a beam-irradiated region on the object is one location and is continuously irradiated with ASE light attributed to Yb ions for 10 ms or more.

6. A laser processing method of splitting processing laser light into a plurality of beams and thereafter projecting each of the plurality of beams through a condenser lens onto an object, said laser processing method comprising the steps of:

generating ASE light which has a spectrum with a predetermined full width at half maximum and which has a beam quality $M^2$ of 2 or more but less than 10, as the processing laser light;

splitting the ASE light thus generated, into a plurality of beams, by using a DOE (Diffractive Optical Element); and projecting each of the plurality of split beams through said condenser lens onto the object, the plurality of beams thus split being homogenized as a whole and inputted into said condenser lens while being in parallel to each other.

7. A laser processing method according to claim 6, wherein the ASE light has a spectrum whose full width at half maximum is over 35 nm.

8. A laser processing method of splitting processing laser light into a plurality of beams and thereafter projecting each of the plurality of beams through a condenser lens onto an object, said laser processing method comprising the steps of:

generating ASE light which has a spectrum with a predetermined full width at half maximum and which has a beam quality $M^2$ of 2 or more but less than 10, as the processing laser light;

splitting the ASE light thus generated, into a plurality of beams; and projecting each of the plurality of split beams through said condenser lens onto the object, the plurality of beams thus split being homogenized as a whole and inputted into said condenser lens while being in parallel to each other, wherein a spectrum shape of the ASE light is varied with time with a time constant of 10 ms or less.

9. A laser processing method according to claim 6, wherein each of beam-irradiated regions on the object is continuously irradiated for 10 ms or more.

10. A laser processing method according to claim 1, wherein the homogenous ASE light projected by the condenser lens has a spectrum whose full width at half maximum is over 35 nm.

11. A laser processing method according to claim 6, wherein the homogenous ASE light projected by the condenser lens has a spectrum whose full width at half maximum is over 35 nm.

* * * * *